United States Patent [19]
Anderson

[11] Patent Number: 4,660,511
[45] Date of Patent: Apr. 28, 1987

[54] FLUE GAS HEAT RECOVERY SYSTEM

[76] Inventor: J. Hilbert Anderson, 1615 Hillock La., York, Pa. 17403

[21] Appl. No.: 846,748

[22] Filed: Apr. 1, 1986

[51] Int. Cl.$^4$ .............................................. F22D 1/02
[52] U.S. Cl. ................................. 122/420; 122/1 C; 122/20 B; 122/451 S
[58] Field of Search .................. 122/420, 451 S, 20 B, 122/1 C; 60/39.182

[56] References Cited

U.S. PATENT DOCUMENTS

| | | | |
|---|---|---|---|
| 4,489,679 | 12/1984 | Holt | 122/420 X |
| 4,491,093 | 1/1985 | Hoekstra | 122/420 |
| 4,501,233 | 2/1985 | Kusaka | 122/420 X |

Primary Examiner—Edward G. Favors
Attorney, Agent, or Firm—Wigman & Cohen

[57] ABSTRACT

A method and apparatus for recovery of heat from the flue gas of the combustion furnace of a steam boiler or power generation plant uses a heat pump heat extracted from a lower temperature point in the system to a higher temperature point in the system. The flue gas is passed through an economizer to preheat the boiler feed water. The flue gas then passes to a direct contact gas cooler where a second stream of cooling water extracts heat from the flue gas. The second stream of cooling water is passed through the evaporator of the heat pump to heat a refrigerant. The refrigerant is compressed and then condensed in thermal contact with the boiler feed water to heat it before it enters the economizer. In a second embodiment a power generation plant has a steam turbine and an auxiliary vapor turbine. The flue gas is passed through a gas cooler and gives up heat to a stream of cooling water. The heat is extracted from stream of cooling water and pumped by a heat pump to heat a stream of refrigerant which drives the vapor turbine thus generating additional power. A third embodiment is also disclosed.

39 Claims, 3 Drawing Figures

FLUE GAS HEAT RECOVERY SYSTEM

BACKGROUND OF THE INVENTION

The present invention relates to the recovery of heat from the flue gas of a combustion furnace, and more particularly to the utilization of the heat recovered from the flue gas to increase the steam production from a steam boiler or to increase the power production capability of a power generation plant.

In the typical combustion system of a steam boiler or power generation plant in which burning fuel discharges smoke, flue gas and other contaminants into the atmosphere, a considerable amount of heat is also discharged and therefore wasted. It is therefore highly desirable to be able to recover and utilize the heat that is being wasted to the atmosphere. Many fuels which are currently of interest contain a large amount of water which must be evaporated from the fuel. Such fuels may also contain considerable hydrogen, which when burned produces water vapor. Some examples of such fuels are garbage, natural gas, wood pulp, waste liquor from a paper plant, and others. All of these fuels burn and produce a considerable amount of water vapor in the flue gas. Since water vapor has a very high latent heat of evaporation, it would be very desirable to collect this heat and use it in the steam generation cycle or power generation cycle. In particular, the heat of condensation of the flue gas may be recovered by reducing the flue gas temperature to a value as low as 80° F. When the flue gas temperature is lowered to 80° F., very little water vapor remains in the gas, and a great amount of heat is removed from the gas, which can be used at various points in the thermodynamic cycle. By way of illustration, flue gas leaving the boiler or furance at a typical temperature of 600° F. and having a dew point of gas with water evaporated in the gas as high as 150° F. has an enthalpy or heat content of 275 Btus per pound of dry gas. If the gas is cooled to a temperature of 80° F., the enthalpy is reduced to approximately 43.7 Btus per pound. Thus, approximately 232 Btus per pound of gas can be collected if the gas temperature is reduced from 150° F. to 80° F.

It is known in the prior art to pass the feed water entering a steam boiler into thermal contact with the flue gases exiting the combustion furnace of the boiler to economize the heat in the flue gases. Furthermore, it is known to preheat the water entering a heat recovery unit so as to maintain the temperature in the heat recovery unit above the condensation temperature of the gas prevent corrosion by the gas of the heat recovery tubes. Examples of such prior art are U.S. Pat. Nos. 1,219,320 to Jacobus; 2,699,759 to Kuhner; 3,675,423 to Vidal et al; 4,173,949 to Roethe; and 4,370,949 to Beckett. It is also known to cool gases exiting a heat exchanger by contacting the flue gases directly with water in a gas washing or scrubbing apparatus. Examples of a direct contact scrubbers are found in U.S. Pat. Nos. 3,884,162 to Shuster; 3,848,548 to Bolejack, Jr. et al.; 3,457,883 to Ankersen; 3,482,533 to Ankersen; 3,665,871 to Schwartz, Jr. et al; and 3,812,793 to Solomon. In the flue gas heat recovery systems of the prior art, however, a great deal of the heat from the flue gas is wasted. Much of the wasted heat is retained in the water vapor in the flue gas, which has not been cooled to a sufficiently low temperature to extract all the heat which it contains. Furthermore, the heat which is recovered is not applied to the point in the thermodynamic cycle where it will be most efficiently recovered into increased steam production for a steam boiler or increased power production capability for a power plant.

SUMMARY AND OBJECTS OF THE INVENTION

In view of the foregoing limitations and shortcomings of the prior art devices as well as other disadvantages not specifically mentioned above, it should be apparent that there still exists a need in the art for a flue gas heat recovery system which recovers all of the heat in the flue gas discharged from the combustion furnace and which applies the heat to the most efficient points in the thermodynamic cycle of the steam or power generation cycles. It is, therefore, a primary object of this invention to fulfill that need by providing a thermodynamically efficient system which is capable of maximizing the recovery of the heat content of flue gas while at the same time condensing the corrosive liquids from the cooled flue gas in sections designed to handle such corrosive liquids. The foregoing primary objective is carried out by utilization of multi-stage flue gas heat exchangers and by providing a heat pump having one or more stages for pumping heat removed from the water cooling the flue gas at a lower end of its temperature range for use at a higher temperature.

More particularly, it is an object of this invention to apply the heat recovered from the flue gas at a point in the steam or power generation cycle where it is most efficiently utilized.

It is another object of this invention to provide an economizer in a flue gas heat recovery system which operates at a temperature above the dew point of the flue gas.

Yet another object of this invention is to provide a flue gas heat recovery system being a direct contact gas cooler which operates at a temperature below the dew point of the flue gas.

Still another object of this invention is to provide a heat flue recovery system having a direct contact gas cooler which recovers the heat from the water vapor present in the flue gas to a temperature as low as 80° F.

Briefly described, the aforementioned objects are accomplished according to the invention by passing a first stream of cooling water in thermal contact with the flue gas exiting from the boiler, passing a second stream of cooling water in direct contact with the flue gas at a temperature lower than the first stream and pumping the second stream through a heat pump to transfer heat from the lower temperature second stream to a higher temperature point in the thermodynamic cycle of the steam generating or power generating plant. In the case of the steam generating plant, the heat pump transfers heat from the second cooling stream to the first cooling stream which is fed to the steam boiler of the power generation plant to generate steam. In the case of the power generating plant, the heat from the second stream is transfered by the heat pump to a working fluid which drives a supplementary power generator. An additional contact gas cooler and third stream of cooling water may be added to further increase the efficiency of heat recovery from the flue gas. In an additional embodiment in which steam is generated for process water, a third stream of cooling water passes in direct contact with the flue gas at a temperature intermediate the temperature of the first and second streams. A portion of the third stream is used in an air heater to preheat the combustion air entering the boiler, and an additional portion of the third stream passes in heat exchange relationship with the feed stream feeding the process water into the boiler. With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF THE PREFERRED EMBODIMENTS

Figure 1:
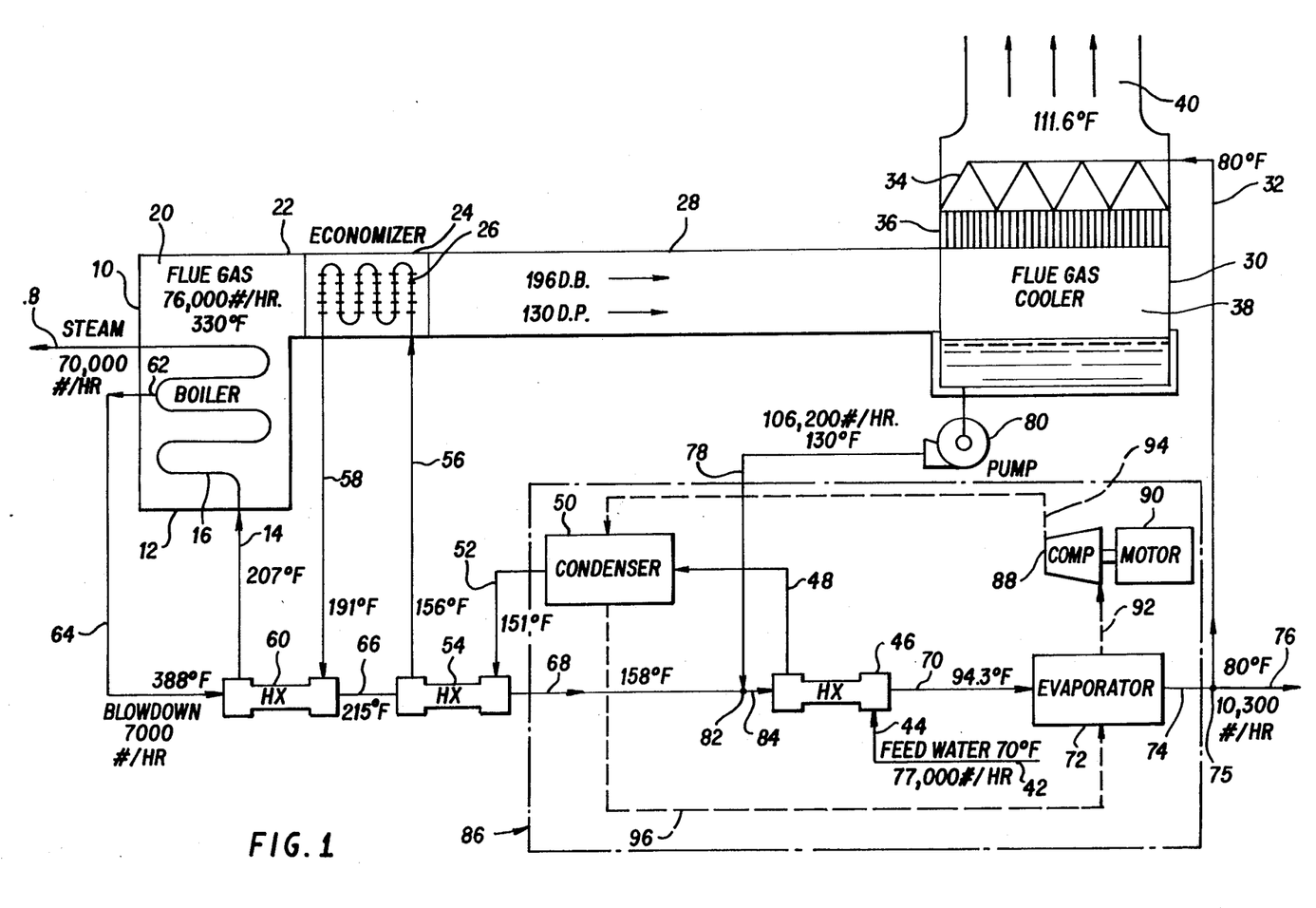
FIG. 1 is a schematic diagram of a basic flue gas heat recovery system in accordance with the invention.

Referring now in detail to the drawings there is illustrated in FIG. 1 a first embodiment of a flue gas heat recovery system in accordance with the invention used in a steam generation plant.

Flue Gas System

The steam generation plant has a steam boiler 10 which contains a combustion furnace 12. Feed water which has been preheated (e.g., to 207° F.) in a manner described below, enters the boiler at line 14 and passes through the boiler in tubes 16. Fuel and oxygen are combusted in combustion furnace 12 to heat the water in tubes 16 to generate steam which exits the boiler at line 18. Hot flue gas, the combustion products of the combustion which takes place in combustion furnace 16, passes through flue 20 of the boiler and exits the boiler through duct 22. The flue gas passes through duct 22 into economizer 24 where it is indirectly cooled by a first stream of cooling water flowing through tubes 26. In a typical example, 76,000 pounds per hour of flue gas at 330° F. is generated in combustion furnace 16, exits flue 20 through duct 22 and passes into economizer 24. It will be noted that the values given for flow rates and temperatures throughout the specification are exemplary only and vary depending on a variety of conditions within the system. While it is desirable that the flue gas give up as much of its heat as possible to the first stream of cooling water flowing through tubes 26 of economizer 24, it is important that the flue gas not be cooled below the dewpoint of the flue gas in order to prevent the acid components (e.g. oxides of sulfur, nitrogen, carbon) of the flue gas from condensing onto the heat exchanger surfaces of tubes 26, and causing corrosion, fouling, and plugging of the heat exchanger surfaces. In the example of FIG. 1, the dew point of the flue gas is 130° F.

Having given up some of its heat to the first stream of cooling water, the flue gas exits economizer 24 and passes through duct 28 into gas cooler 30. The flue gas exits economizer 24 and enters flue gas cooler 30 at a temperature of 196° F. Flue gas cooler 30 is a direct contact contact vertical cooler in which a second stream of cooling water enters at 80° F. from line 32 and is sprayed downwardly by sprayheads 34 through baffles 36 into a central passageway 38. Flue gas enters central passageway 38 from duct 28 and passes upwardly in counterflow heat exchange with the second stream of cooling water where it is again cooled before exiting through stack 40 to the atmosphere.

As shown in FIG. 1, flue gas cooler 30 provides an efficient heat transfer surface in a short and compact space resulting in a low cost and effective flue gas cooling system. The flue gas is cooled in cooler 30 from 196° F., with a dew point of approximately 130° F., down to a temperature of 111.6° F., and during this cooling process much of the water vapor and impurities contained in the flue gas is condensed and subsequently removed from the system in a manner to be described hereinafter.

Through proper design of flue gas cooler 30, the flue gas temperature exiting stack 40 can be brought to within 1° or 2° of the temperature of the second stream of cooling water entering through line 32, notwithstanding the 31.6° F. temperature differential shown in FIG. 1 between the entering water and exiting flue gas.

Feedwater System

As mentioned earlier, the feedwater entering boiler 10 is preheated. The feed water enters the system at inlet 42 at a temperature of 70° F. Fresh water from a pond, stream, or the like, is one source of feed water. The feedwater passes at a rate of 77,000 pounds per hour from inlet 42 through line 44 into a heat exchanger 46, through line 48 into condenser 50, through line 52 into a heat exchanger 54, and through line 56 to enter economizer 24. In this manner the feedwater temperature is raised and becomes the first stream of cooling water which contacts the hot flue gas entering economizer 24. The feedwater is heated at each stage of its passage through heat exchanger 46, condenser 50, and heat exchanger 54 on its way to economizer 24. In particular, feedwater entering heat exchanger 46 is heated from 70° F. to 125° F. by water which has been blown down from boiler 12 as will be explained hereinafter. Feedwater exits heat exchanger 46 via line 48 and enters condenser 50 of heat pump 86 and is heated from 125° F. to 151° F. by a process which will be explained hereinafter. Feedwater next exits condenser 50 through line 52 and enters heat exchanger 54 where it is heated by higher temperature blow down water from 151° F. to 156° F. The feedwater exits heat exchanger 54 through line 56 and enters economizer 24 at 156° F. The feedwater is heated by the hot flue gas in economizer 24° to 191° F. and exits by line 58. Finally, the feed water is further heated by the high temperature blow down water from 191° F. in heat exchanger 60 and enters the tubes 16 of boiler 10 through line 14.

Blowdown System

Raw feedwater which enters boiler 10 through line 14 contains impurities which have a tendency to be deposited and to build up in boiler tube 16. These deposits are prevented by blowing down some of the water from boiler 10 to the atmosphere after recovering the heat content of the water. Thus, water is blown down from boiler 10 at junction point 62 through line 64 at a temperature of 388° F. at a rate of 7,000 pounds per hour. The hot blowdown water leaves the boiler tube 16 at line 64 and is first cooled in heat exchanger 60 by the feed water leaving economizer 24 through line 58. In turn, the feedwater from economizer 24 is heated from 191° F. to 207° F. before entering boiler tubes 16 through line 14. The blowdown water is cooled in heat exchanger 60 from 388° F. to 215° F. and enters heat exchanger 54 via line 66 where it heats the feedwater from condenser 50 from 151° F. to 158° F. The blowdown water, in turn, is cooled from 215° F. to 158° F. and then exits heat exchanger 54 through line 68 into heat exchanger 46 where the feedwater coming into the system through inlet 42 through line 44 on its way to condenser 50 through line 48 is heated from 70° F. to 125° F. The blowdown water exits heat exchanger 46 through line 70 at 94.3° F. and enters an evaporator 72 where it gives off additional heat as will be explained hereinafter.

The blowdown water exits the evaporator 72 through line 74 and is connected through a junction 75 to exhaust outlet 76 where a smaller portion of the stream (10,300 lbs/hr) is exhausted to the atmosphere at 80° F., with the major portion returned to flue gas cooler 30 through line 32 where it is sprayed into the hot flue gas exiting cooler 30. After cooling the flue gas in flue gas cooler 30, the second stream of cooling water leaves the cooler through line 78 at 130° F. at a rate of 106,200 pounds per hour via pump 80. The heated cooling water enters junction 82 where it is combined with a smaller quantity of blowdown water exiting heat exchanger 54 through line 68 at a temperature of 158° F. The combined stream is at a temperature approximately 132° F. before it enters heat exchanger 46 via line 84 to initially heat the incoming feedwater as previously explained.

The water which is discharged from the system from the exhaust outlet 76 contains impurities which have been blown down in the boiler as well as some contaminants such as carbon dioxide as well as other contaminants which are present in the flue gas and which condensed in the flue gas cooler 30. This water may be discharged as waste water or used to recover carbon dioxide for sale. Contaminants such as sulfur dioxide may be neutralized by a scrubbing process as is known in the industry.

It should be noted that there are some cases in which it is undesirable to mix the blowdown water with the water being circulated through the flue gas cooler. The chemical constituents in the blowdown water may in some cases not be compatible with the water that circulates through the flue gas cooler. For example, very often blowdown water is highly alkaline, whereas water that is condensed in the direct contact flue gas cooler is very often acid in nature. While the materials used to resist corrosion in the flue gas cooler may be suitable for water that is slightly acid, the materials may not be suitable for the addition of blowdown water, which may be quite alkaline.

In such cases the blowdown water can be circulated through separate heat exchangers to perform the same function as though the blowdown water were mixed with the water from the flue gas cooler as shown in FIG. 1. This separation of the water then accomplishes the same results as shown in FIG. 1, but separate heat exchangers need to be used to keep the blowdown water from mixing with the flue gas cooler water.

Heat Pump System

It is important that the water entering economizer 24 be above the dew point of the hot flue gas to prevent the condensation of water-containing acids onto the economizer heat transfer surfaces. The temperature of the water of the second cooling stream exiting flue gas cooler 30 through line 78 is at or below the dew point of the flue gas (e.g. 130° F.). Since the temperature of the water entering economizer 24 from line 56 must be above the dew point of the flue gas (e.g. 156° F.), there is a temperature gap (e.g. 26° F.) between these two streams which must be bridged in order to efficiently transmit heat from the flue gas stream to the water stream to be heated and maintain the flue gas stream temperature above its dew point. To bridge the temperature gap between the water temperature that can be reached at the exit of flue gas cooler 30 and the entrance of economizer 24, heat pump 86 is used. Heat pump 86 removes heat from the lower temperature second stream of cooling water exiting flue gas cooler 30 and injects it into the higher temperature first stream of cooling water entering economizer 24 through line 56. Thus, heat pump 86 is used to heat the feedwater from 125° F. at line 48 to 151° F. at line 52 which is further heated to 156° F. at line 56 by the blowdown water passing from line 66 through line 68 in heat exchanger 54. The function of condenser 50 of heat pump 86 is to raise the temperature of the feedwater above the dew point of the flue gas. By this novel approach condensation of acids or water vapor in the economizer 24 which would cause corrosion and fouling is prevented.

A heat pump system generally indicated by the numeral 86 (FIG. 1) is per se conventional and comprises an evaporator 72, a compresser 88 having motor 90, and a condenser 50. The combined stream of water passing from heat exchanger 46 through line 70 passes through evaporator 72 where it vaporizes a liquid refrigerant contained therein. The refrigerant may be any suitable conventional refrigerant such as R11 or R12. As shown by dashed lines in FIG. 1, the gaseous refrigerant exits the evaporator 72 through line 92 and enters compressor 88 where it is compressed by motor 90. The high pressure gas exits compressor 88 through line 94 and is liquified in condenser 50 giving off heat and thereby raising the temperature of the feedwater passing through condenser 50 from 125° F. to 151° F.

The liquified refrigerant is returned to evaporator 72 via line 96 to complete the cycle. In this manner heat pump 86 recovers heat from the second stream of cooling water flowing from line 70 to line 74 through evaporator 72 and transfers this recovered heat to the first stream of cooling water flowing from line 48 through condenser 50 to line 52. The heat pump thus takes low temperature heat recovered from the flue gas cooler which prior art systems ignore, pumps it to a higher temperature, and utilizes it at a higher temperature point in the thermodynamic cycle of the steam generation plant.

The flue gas cooler 30 illustrated in FIG. 1, as previously described, is a vertical cooler in which cooling water is sprayed downwardly in counterflow to the flue gas entering the cooler. It is possible to substitute a tunnel cooler having a long water tunnel with rotating water surfaces, such as paddles in the tunnel. However, the vertical cooler has been found to be most efficient, providing sufficient heat transfer surface in a short and compact space.

Figure 2:
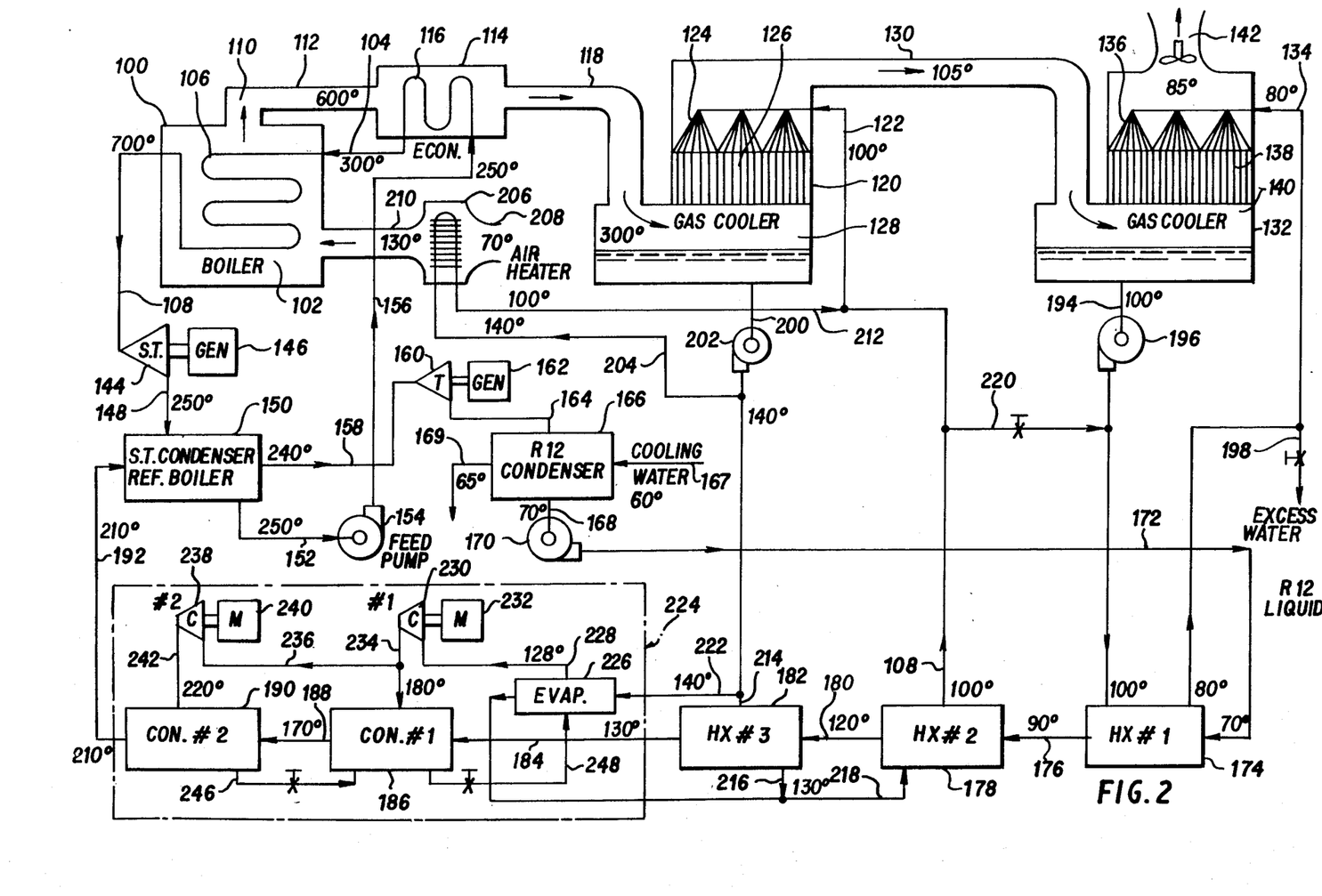
FIG. 2 is a schematic diagram of a flue gas heat recovery system used in a steam turbine power generation plant in accordance with the invention.

Referring now to FIG. 2, a second embodiment of the invention is shown in which the flue gas recovery system is used in a power generation plant having a main steam turbine for power generation and an auxiliary vapor turbine to convert the heat recovered from the flue gas into power.

Flue Gas System

The power generation plant has a steam boiler 100 which contains a combustion furnace 102. Feed water enters the boiler at line 104 and passes through the boiler in tubes 106. Fuel and oxygen are combined in combustion furnace 102 to heat the water in tubes 106 to generate steam which exits the boiler at line 108. Flue gas, the combustion products of the combustion which takes place in combustion furnace 102, rises through flue 110 of the boiler and exits the boiler through duct 112 at 600° F. The flue gas passes through line 112 into economizer 114 where it comes into thermal contact with a stream of cooling water flowing through tubes 116. The flue gas exits economizer 114 through duct 118 at 300° F. and enters a gas cooler 120. In gas cooler 120 the flue gases pass in direct contact for counter-current flow with a stream of water which enters gas cooler 120 by line 122 and is sprayed by spray heads 124 to wet the surfaces of baffles 126 before entering the central passageway 128 of the cooler.

After giving up heat to the stream of cooling water in gas cooler 128, the flue gas rises and leaves gas cooler 120 through duct 130 at 105° F. The flue gas passes through duct 130 into a second gas cooler 132. Gas cooler 132 is also a direct contact vertical gas cooler in which the flue gas passes in counter-current flow in contact with a stream of water which enters the cooler through line 134 and which is sprayed by sprayheads 136 onto baffles 138 before passing into the central passageway 140 of gas cooler 132. The flue gas is cooled from 105° F. to 85° F. by the stream of cooling water in gas cooler 132 before exiting through stack 142 to the atmosphere. At this point, the flue gas contains only approximately 0.025 pounds of water vapor per pound of dry gas.

Steam System

Steam is generated in tubes 106 of boiler 102 and exits the boiler through line 108 at 700° F. and at a pressure of about 18 atm. The steam passes through a steam turbine 144 to drive a generator 146. Steam is exhausted from turbine 144 to line 148 at a condensing temperature of 250° F. The steam passes through line 148 into a condenser 150 where it gives up its heat to boil a refrigerant as will be explained hereinafter. The condensed steam, now in the form of water, leaves condenser 150 by line 152 and is pumped at a high pressure of 19 atm. by feed pump 154 through line 156 into economizer 114 Ulates through tubes 116 of economizer 114 and is heated to 300° F. where it enters boiler tubes 106 via line 104.

The water flowing through tubes 116 thus serves as a stream of cooling water for the flue gas and is further preheated by the flue gas and used as feedwater for the boiler to produce steam.

Heat Pump System

In this embodiment a heat pump having a two-stage compresser and a two-stage condenser is used. A refrigerant circulates in steam condenser 150 in thermal contact with the condensing steam entering through line 148. The refrigerant is a conventional refrigerant such as R-12, isobutane, propane, or the like. The refrigerant is heated by condensing steam in condenser 150 and exists as a high pressure vapor at 240° F. by line 158. The vapor passes from line 158 into a vapor turbine 160 and expands to a low pressure corresponding to a condensing temperature of 70° F. In expanding, the vapor rotates turbine 160 to drive generator 162 to produce electrical energy. Refrigerant vapor leaves turbine 160 by line 164 and enters a refrigerant condenser 166. The refrigerant vapor is condensed in condenser 166 by thermal contact with cooling water which enters through line 167 at 60° F. and exits through line 169 at 65° F. The cooling water can be supplied from a river, a cooling pond, or an aircooled device such as a cooling tower. Such cooling water supplies are known in the art and are not illustrated in the drawing.

The refrigerant exits condenser 166 as a liquid by line 168 and is pumped by pump 170 through line 172 into a heat exchanger 174. The refrigerant passes from heat exchanger 174 through line 176 into a second heat exchanger 178, through line 180 into a third heat exchanger 182, through line 184 into a first condenser 186, through line 188 into a second condenser 190, and through line 192 back to steam condenser 150. Passing through heat exchangers 174, 178, 182, and condensers 186 and 190, the refrigerant is heated in stages from 70° F. to 210° F. as will be explained in greater detail hereinafter.

A stream of cooling water in gas cooler 132 which enters at 80° F. through line 134 is heated by the flue gas passing through gas cooler 132 and exits the gas cooler at 100° F. by line 194. The stream of cooling water is pumped by pump 196 into heat exchanger 174 where it gives up its heat to the refrigerant entering heat exchanger 174 by line 172. The refrigerant is heated from 70° F. to 90° F. The stream of cooling water exits heat exchanger 174 at 80° F. and returns to gas cooler 132 through line 134.

Since excess water is continually added to gas cooler 132 due to condensation of water vapor from the flue gas, line 134 is provided with a drain line 198 so that excess water may be drained from gas cooler 132.

The stream of cooling water in gas cooler 120 is heated by the flue gas in the gas cooler to 140° F. The stream of cooling water exits gas cooler 120 through line 200 and is pumped by pump 202 into three separate streams. One stream passes through line 204 into an air heater 206 where it gives up its heat to ambient air entering the air heater at 70° through inlet 208. The air is preheated for combustion and exits heater 206 through duct 210 at 130° F. The preheated air passes from duct 210 to combustion furnace 102 of boiler 106 where it is burned together with the fuel. The stream of cooling water exits air heater 206 at 100° F. by line 212 and rejoins line 122 which returns the stream of cooling water to gas cooler 120.

Another portion of the stream of cooling water exiting gas cooler 120 through line 200 passes through line 214 into heat exchanger 182, where it gives up its heat to raise the temperature of the refrigerant passing through heat exchanger 182 from 120° F. to 130° F. The water exits heat exchanger 182 through line 216 and passes through line 218 into heat exchanger 178. In heat exchanger 178 the water further heats refrigerant passing through the heat exchanger from 90° F. to 120° F. The water exits heat exchanger 178 by line 108 and rejoins line 122 through which it is returned to gas cooler 120. Excess water which has collected in gas cooler 120 is drained through line 220 which interconnects line 108 returning to gas cooler 120 and line 194 exiting gas cooler 132.

Another portion of the stream of cooling water exiting gas cooler 120 through line 200 passes through line 222 into a heat pump 224 where it enters the evaporator 226 of the heat pump. In evaporator 226 the stream of water gives up its heat to evaporate a refrigerant circulating in heat pump 224 and exits at 130° F. by line 218.

In line 218 the stream of water leaving the evaporator is combined with the stream of water leaving heat exchanger 182 through line 216, and the combined stream enters heat exchanger 178 to heat the refrigerant as previously explained.

In heat pump 224 the refrigerant leaves evaporator 226 as a vapor at 128° F. by line 228 and enters the first stage 230 of a two-stage compressor. First stage compressor 230 is driven by motor 232 and compresses the refrigerant vapor to a saturation temperature of 180° F. The compressed refrigerant vapor exits compressor 230 through line 234 and a portion of the refrigerant is diverted through line 236 to second stage compressor 238 driven by motor 240. In second stage compressor 238 the refrigerant is compressed to a higher level corresponding to a saturation temperature of 220° F. The refrigerant vapor exits compressor 238 through line 242 and enters condenser 190 where it condenses to a liquid and gives up its heat to the refrigerant entering the condenser at line 188. The refrigerant entering at line 188 is heated in condenser 190 from 170° F. to 210° F. and exits the condenser at line 192 on its way to steam condenser 150.

The refrigerant entering condenser 190 through line 242 as a vapor condenses and exits the condenser as a liquid at line 246. The refrigerant exiting condenser 190 through line 246 enters condenser 186 where it is combined with the refrigerant leaving first stage compressor 230 through line 234. In condenser 186 the combined refrigerant gives up its heat to the refrigerant entering through line 184. The refrigerant entering at line 184 is heated from 130° F. to 170° F. and exits the condenser at line 188.

The refrigerant entering condenser 186 through lines 246 and 234 exits through line 248 and is returned to evaporator 226. Thus, the heat from the stream of cooling water exiting gas cooler 120 through line 200 is supplied to heat pump 224 through line 222 to heat the refrigerant entering the heat pump at line 184 from 130° F. to 210° F.

It is noted that the embodiment of FIG. 2 employs two separate flue gas coolers in series. There are distinct advantages to using two gas coolers in series as illustrated by the following analysis with reference to Table I.

TABLE I

| TEMPERATURE (F.°) | ENTHALPY $(h_s)$ | $lb_w lb_a$ $(w_s)$ | $\Delta h_s$ | $\Delta w_s$ |
|---|---|---|---|---|
| 170 | 532.26 | .433 | 155.52 | .134 |
| 160 | 376.74 | .299 | 101.29 | .086 |
| 150 | 275.45 | .213 | 69.63 | .059 |
| 140 | 205.82 | .154 | 49.75 | .0423 |
| 130 | 156.07 | .1117 | 36.46 | .0301 |
| 120 | 119.61 | .0816 | 27.22 | .0221 |
| 110 | 92.39 | .0595 | 20.63 | .0163 |
| 100 | 71.76 | .0432 | 15.81 | .0120 |
| 90 | 55.95 | .0312 | 12.25 | .0089 |
| 80 | 43.70 | .0223 | | |

The enthalpy or heat content $(h_s)$ (Col. 2) and the amount of vapor $(w_s)$ present (Col. 3) in saturated gas at its corresponding temperature (Col. 1) is shown in Table I. The difference in enthalpy $(\Delta h_s)$ of the gas from 80° F. up to 170° F. along with the difference in the amount of water vapor $(\Delta w_s)$ present is shown in columns 4 and 5, respectively. The data presented in Table I is taken directly from the standard psychrometric tables published in Section 6.4 in the ASHRAE handbook. The values listed are for air, but the properties are similar to or even conservative for flue gas, particularly since the great amount of heat content present in the flue gas is primarily due to water vapor.

Referring now to Table I, if one pound of dry gas is cooled from 140° F. to 80° F., the change in enthalpy $(\Delta h_s)$ equals 162.12 Btu. This energy is used to heat 2.7 lbs. of water from 70° F. to 130° F. However, if the gas is cooled in two stages, e.g. from 140° F. to 110° F. and then from 110° F. to 80° F., the following will occur. The heat recovered $(\Delta h_s)$ from gas cooled from 140° F. to 110° F. is 113.43 BTU. This energy will raise the temperature of 3.781 lbs. of water from 100° F. to 130° F. Next, the gas is cooled from 110° F. to 80° F. in a second cooler and the amount of heat recovered is 48.69 BTU. This energy will raise the temperature of 1.623 lbs. water from 70° F. to 100° F. The significance of the difference between heating two separate streams of water in two separate coolers is that by using two separate coolers much more water is heated at the higher temperature than at the lower temperature. Since higher temperature heat is much more valuable thermodynamically than lower temperature heat, this becomes a significant factor in efficiently heating the liquid refrigerant and the combustion air.

Again referring to FIG. 2, since the water flow in gas cooler 132 is used to heat refrigerant from 70° F. to 90° F. in heat exchanger 174, then, since there is much more heat available in gas cooler 128 as illustrated above, a greater rate of water flow may be heated from 100° F. to 140° F. in gas cooler 128 than can be heated from 80° F. to 100° F. in gas cooler 132. Therefore, to heat the refrigerant from 90° F. to 130° F. in heat exchangers 178 and 182 does not require the same quantity of heat from the water as is produced by gas cooler 128. For this reason, part of the water leaving gas cooler 128 at 140° F. can be split off to heat combustion air in combustion air heater 206 and part can be split off to heat the refrigerant to a higher temperature by putting some of the heat into the evaporator 226 and then using heat pump 224 to raise the temperature of the refrigerant evaporated in evaporator 226 to 180° F. at line 234, and then injecting this heat into condenser 186 where the condensing refrigerant heats the liquid refrigerant from 130° F. to 170° F.

The principle is further illustrated by the fundamental Carnot efficiency equation for heat engines. The Carnot efficiency equation shows the maximum possible efficiency of conversion of heat into mechanical energy between the temperature at which heat is added to the heat engine, $T_H$, and the temperature at which heat is rejected from the engine, $T_L$:

$$\text{Efficiency} = (T_H - T_L)/T_H$$

This equation shows that the higher the temperature at which heat is added the higher the efficiency becomes. In an ordinary boiling and condensing cycle, not all of the heat can be added at the upper and boiling temperature, but some must be added to heat the liquid between the condensing temperature and the boiling temperature. Since this heat is added at lower temperatures than at the boiling temperatures, it reduces the potential efficiency in the cycle.

In the present invention, by using heat from the flue gas, which is ordinarily wasted, to heat the liquid from the condensing temperature as nearly as possible to the boiling temperature, the thermodynamic power cycle efficiency can be effectively increased. This illustrates why it is advantageous to heat the liquid refrigerant to as high a temperature as possible by using the waste heat from the flue gas. This means that the exhaust heat from steam turbine 144 needs to supply less heat per pound of refrigerant in boiler 150 and can thus boil more pounds of refrigerant per pound of condensed steam, and can thus produce more power from turbine 160. By using heat pump 224 to raise the temperature of the refrigerant from 130° F. to 210° F., more of the waste heat is utilized and the temperature of the liquid refrigerant is raised even higher than can be done simply by using the water exiting gas cooler 128 from line 200 at 140° F.

Since a heat pump requires power which may be generated in the embodiment in FIG. 2 by turbine 160 it is surprising that a thermodynamic analysis reveals that in some cases it is very worthwhile to use a heat pump to put heat into the system even though the heat pump uses power generated by the main turbine. The fundamental reason for this is that the heat pump is used to put heat into the system at a lower temperature thereby replacing the need to put it in at a higher temperature and the turbogenerator utilizes heat put in at a high temperature to produce the power. This principle can be illustrated by using the potential or theoretical efficiency of the power cycle in comparing it with the coefficient of performance of a heat pump cycle.

The theoretical efficiency of a power cycle is given in the equation above where the values of T are in degrees Rankine or degrees Fahrenheit absolute. Substituting the temperature values for the vapor turbine cycle of FIG. 2 in which the temperature of the refrigerant leaving steam condenser 150 at line 158 is 240° F. and the temperature of the refrigerant entering the cycle at line 172 is 70° F., then $T_H = 700°$ R and $T_L = 530°$ R, and the calculated theoretical efficiency is 0.243.

The coefficient of performance of the heat pump cycle is the ratio of the amount of heat put in to the amount of theoretical mechanical efficiency required to pump that heat into the cycle at the temperature above where it is received by the heat pump. The equation for the coefficient of performance (COP) is:

$$COP = T_H/(T_H - T_L)$$

Computing the coefficient of performance (COP) for the first stage heat pump compressor 230 of FIG. 2, vapor enters the first stage heat pump compressor 230 at 128° F. and is pumped to a temperature of 180° F. Thus, $T_H = 640°$ R and $T_L = 588°$ R, and the coefficient of performance equals 12.3. From the foregoing it is seen that since the power generated is 0.243 times the amount of heat that is put into this cycle and this power can be used to pump 12.3 times as much heat into the cycle as the amount of power required, then any heat put in by the heat pump cycle can generate more power than it uses. Therefore, it is theoretically practical and improves the overall cycle efficiency by using the heat pump to pump in the heat at a low temperature, even though it uses power generated by the high temperature heat.

In actual practice the power cycle is less efficient than the theoretical value and the coefficient of performance of the heat pump is less than calculated by the theoretical equations. However, turbine efficiencies and compressor efficiencies have been improved to such a great extent that it is reasonable to expect that the use of a heat pump in this manner can show good improvements in the overall efficiency and in the economics of the power plant.

The use of a second stage heat pump compressor 238 in the embodiment shown in FIG. 2 injects heat into the system at a higher temperature than that injected by the first stage compressor 230. The use of two stages of heat pump compressors is more efficient than would be the case if a single stage heat pump compressor pumped the heat into the system at 220° F. The reason for this is that approximately one-half of the heat needs to be compressed through a cycle only to 180° F. and one-half of the heat then only needs to be pumped from a temperature of 180° F. to 220° F. The power required is then much less than if all the heat was pumped into the system from a temperature of 128° F. to 220° F.

While the illustrated embodiment shows two separate motor driven compressors, it is considered to be within the scope of the invention to incorporate two stages of compression in a single compressor casing which is driven by a single motor or turbine. The same principle of rejecting part of the stream between the stages applies whether the two stages of compression are in a single casing or if separate compressors are used. It is also possible to use more than two stages of compression where economically feasible.

It should be noted that vapor condensers 186, 190 can be low cost condensers since the same conventional refrigerant, e.g., R-12, is utilized as the liquid to be heated by the condensing vapor as the vapor that is being pumped. Therefore, direct contact heat exchange between the refrigerant vapor and the refrigerant liquid may be utilized, eliminating the need for conventional heat transfer surfaces such as a tubular or shell and tube condenser. The potential efficiency of the heat pump cycle is also increased by reducing the temperature difference between the vapor coming from the compressor and the liquid going into the condenser.

Figure 3:
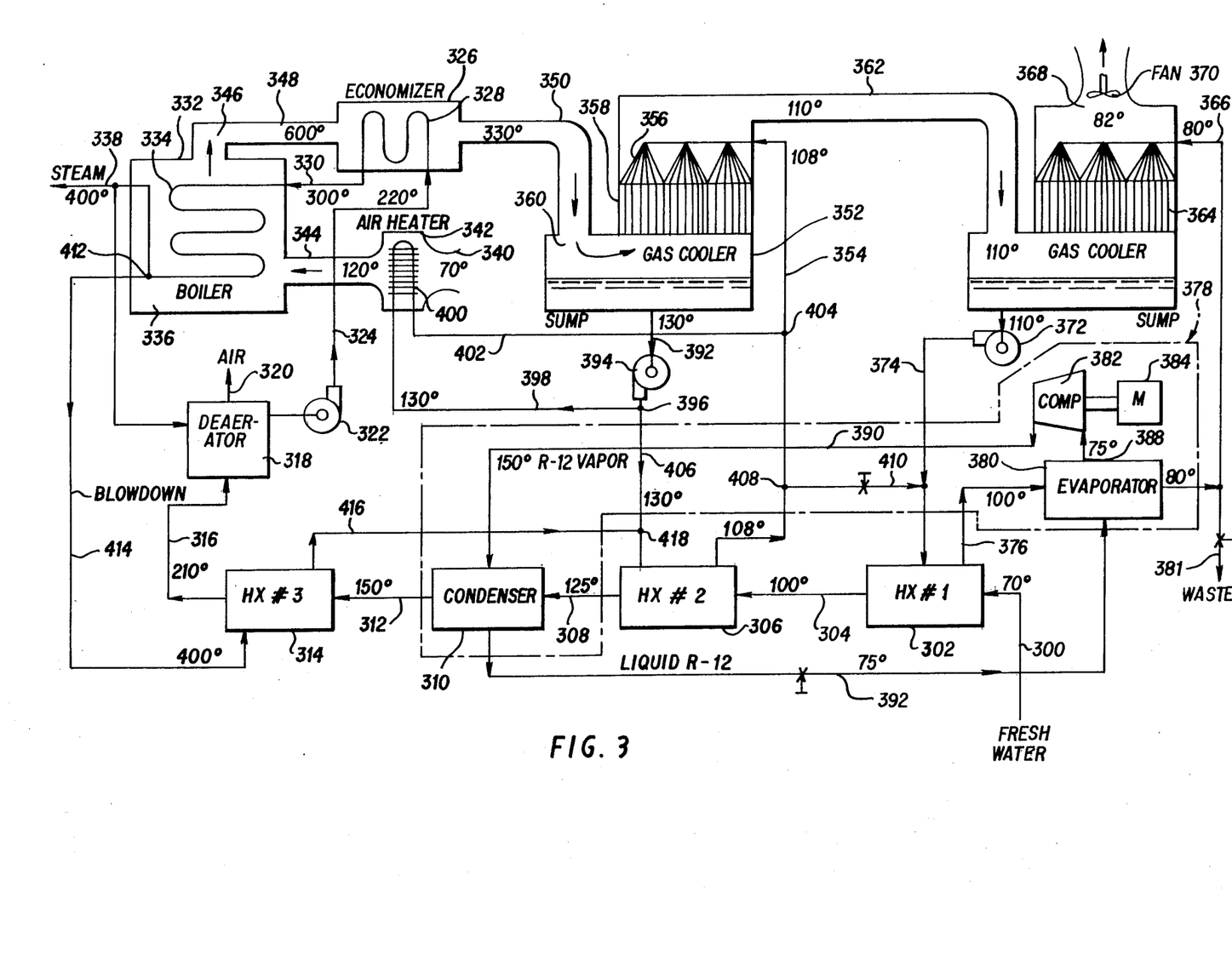
FIG. 3 is a schematic diagram of a flue gas heat recovery system used in a steam generation system for heating process water in accordance with the invention.

Referring now to FIG. 3, a third embodiment of the invention is shown in which the flue gas recovery system is used in a steam generation plant which generates the steam from fresh water for use in process requirements. In this case, the fresh water must be chemically treated and have the air removed before it enters the boiler. Therefore, a deaerator is required. The deaerator normally operates to discharge a small amount of air and vapor from the top of the deaerator at a temperature approximately 210° F. to 220° F. In this case also, since raw feed water enters the boiler there are deposits which tend to build up in the boiler tubes and the deposits are removed by blowing down some of the water from the boiler to the atmosphere. This blowdown water is usually at a temperature close to the temperature of the steam being discharged from the boiler. An additional feature of the embodiment is the use of a second direct contact gas cooler in series with the direct contact gas cooler receiving flue gas from the economizer.

Process Steam Generation System

Fresh water enters the system through inlet 300, passes through heat exchanger 302, exits heat exchanger 302 through line 304 and passes to heat exchanger 306, exits heat exchanger 306 through line 308 and passes to condenser 310, exits condenser 310 through line 312 and passes through heat exchanger 314, exits heat exchanger through line 316 and enters deaerator 318. The fresh water is heated in stages from 70° F. at inlet 300 to 210°

F. at its entry to deaerator 318 through line 316 in heat exchangers 302, 306 and 314 and condenser 310, as will be explained in detail hereinafter.

The deaerator 318 removes air from the fresh water and discharges the air to the atmosphere through line 310, heating the fresh water to 220° F. The deaerated fresh water is pumped by pump 322 through line 324 to economizer 326, is preheated from 220° F. to 300° F. as will be explained in detail hereinafter, and exits the economizer through line 330, passing into boiler 332. The feedwater circulates through boiler tubes 334 where it is heated into steam by combustion furnace 336 of boiler 332. The steam generated in boiler tubes 334 exits boiler 332 through line 338 at 400° F. where it is used in process requirements.

Flue Gas Cooling System

Air is taken into the system for combustion at an air inlet 340 which supplies air at 70° F. to air heater 342 which heats the air to 120° F. Heated air passes through duct 344 into the combustion furnace 336 of boiler 332. Air and fuel are burned in combustion furnace 336 to heat the water circulating through tubes 334, and produce as a by product flue gas which must be discharged to the atmosphere. Flue gas exits the boiler by flue 346 and passes through duct 348 into economizer 326. Flue gas leaves the boiler at 600° F. and heats the fresh water passing through economizer tubes 328 at 220° F. to 300° F. before the fresh water enters the boiler. The flue gas is cooled in the economizer to 330° F. and passes through duct 350 to an intermediate gas cooler 352. Intermediate gas cooler 352 is a direct contact vertical cooler in which a stream of cooling water enters at 108° F. from line 354 and is sprayed downwardly by sprayheads 356 through baffles 358 into a central passageway 360.

Flue gas entering passageway 360 from duct 350 passes in counterflow heat exchange with the stream of cooling water before rising to the top of the cooler and exiting through duct 362. Flue gas exits intermediate gas cooler 352 at 110° F. and passes through duct 362 into a low temperature gas cooler 364. Low temperature gas cooler 364 is a direct contact vertical cooler similar to intermediate cooler 352 and passes a stream of cooling water entering through line 366 at 80° F. in counterflow heat exchange with the flue gas. The flue gas is cooled from 110° F. to 82° F. before it is exhausted through stack 368 by fan 370 to the atmosphere.

The cooling stream of water passing through lower temperature gas cooler 364 is heated by the flue gas from 80° F. to 110° F. and is pumped from cooler 364 by pump 372 through line 374 to heat exchanger 302. In heat exchanger 302 some of the heat extracted from the flue gas in cooler 364 by the stream of water exiting through line 374 is used to heat the fresh water entering heat exchanger 302 through inlet line 300. The stream of water entering heat exchanger 302 through line 374 exits through line 376 to a heat pump generally designated by the numeral 378.

Heat Pump System

Heat pump 378 comprises an evaporator 380, a compressor 382 having a motor 384, and a condenser 310. The cooling streams of water leaving heat exchanger 302 through line 376 enters evaporator 380 to heat and evaporate a refrigerant contained therein. The refrigerant may be any conventional refrigerant such as R-12. The evaporated refrigerant leaves evaporator 380 by line 388 at 75° F. and enters compressor 382 where it is compressed by motor 384. The compressed, evaporated refrigerant leaves compressor 382 by line 390 at 150° F. and enters condenser 310. In condenser 310 the evaporated compressed refrigerant expands and condenses giving up heat to the fres water entering condenser 310 from line 308 and exiting by line 312. The fresh water is heated in condenser 310 from 125° F. to 150° F. The refrigerant returns from condenser 310 at 75° F. to evaporator 380 by line 392. Thus, the heat extracted from the flue gas by the stream of cooling water flowing through lower temperature gas cooler 364 is added to the stream of water passing on to the economizer and then to the boiler.

Furthermore, this heat is used to raise the temperature of the stream passing to the economizer to a temperature above the dewpoint of the flue gas, peventing corrosion in the economizer. The stream of water entering evaporator 380 from line 376 is cooled from 100° F. to 80° F. and exits the evaporator at line 366 where it is returned to the low temperature gas cooler 364. A drain line 381 is provided in line 366 so that excess water may be drained from low temperature gas cooler 364.

Intermediate Flue Gas Cooler

The stream of cooling water in intermediate gas cooler 352 exits the cooler at 130° F. from line 392 and is pumped by pump 394 through a junction 396. A portion of the stream is diverted through line 398 into air heater 342, where the stream passes through heat exchange coils 400 to heat air for combustion furnace 336. The stream exits air heater 342 by line 402 and passes through junction 404 where it returns through line 354 to intermediate gas cooler 352.

A portion of the stream exiting gas cooler 352 through line 392 passes through line 406 into heat exchanger 306. In heat exchanger 306, heat which is extracted from the flue gas in intermediate gas cooler 352 is transfered to the fresh water passing through the heat exchanger 306 to line 308. The fresh water is heated in heat exchanger 306 from 100° F. to 125° F. The stream of cooling water from intermediate gas cooler 352 entering heat exchanger 306 through line 406 at 130° F. exits heat exchanger 306 through line 354 at 108° F. and returns to intermediate gas cooler 352. A junction 408 is provided in line 354 so that excess water which has condensed from the water vapor in the flue gas in intermediate gas cooler 352 may be drained out of the lines of gas cooler 352 through line 410. This excess water merges with the water exiting low temperature gas cooler 364 and is ultimately drained from the system at drain line 381 together with the excess water from low temperature gas cooler 364.

As pointed out previously, it is advantageous to use two gas coolers in series because there is much more heat available from the intermediate gas cooler than from the lower temperature gas cooler because the amount of water vapor condensed at the higher temperature per degree temperature difference is much greater than at the lower temperature.

Blowdown System

Blowdown water is discharged from tubes 334 of boiler 332 at a junction 412 and passes through line 414 to heat exchanger 314. The blow down water is usually at a temperature close to the temperature of the steam being discharged from the boiler, in this case 400° F., and may be as much as ten to twenty percent of the total boiler input water. The blowdown water passing through heat exchanger 314 heats the fresh water from 150° F. to 210° F. The blow down water exits heat exchanger 314 through line 416 and passes through a junction 418 where it is combined with the stream of water exiting from intermediate gas cooler 352 through line 392 to enter heat exchanger 306. The combined stream heats fresh water flowing through heat exchanger 306 from 100° F. to 125° F.

It should be noted that heat pump compressor 382 takes heat out of the system at the lowest available temperature and compresses it to a higher temperature than can be achieved by using the stream of cooling liquid exiting lower temperature gas cooler 364 through line 374. It would also be possible to use the heat pump from a higher temperature source than that supplied to evaporator 380 as shown, but in the present case it is advantageous to use the heat pump from the lowest temperature source.

Note that in some cases, for example, in cases in which systems are small, it may not be economically advantageous to utilize two gas coolers in series as described herein. In those cases, only a single gas cooler may be used.

It should be noted that there are some cases in which it is advantageous to utilize a second economizer to heat the fresh water from approximately 160° F. to 210° F. before entering the first economizer, such as where smaller amounts of blowdown water are used. In this case the heat from the heat pump can advantageously be used to heat the water sufficiently so that condensation will not occur on the economizer tubes.

Although only preferred embodiments are specifically illustrated and described herein, it will be appreciated that many modifications and variations of the present invention are possible in light of the above teachings and within the purview of the appended claims without departing from the spirit and intended scope of the invention.

I claim:

1. A method for recovery of heat from the flue gas discharged from a combustion furnace comprising:
   passing said flue gas in thermal contact with a first stream of cooling water;
   passing said flue gas into direct contact with a second stream of cooling water, wherein the temperature of the second stream of water exiting from direct contact with the flue gas is lower than the temperature of the first stream of water entering into thermal contact with the flue gas;
   pumping said second stream and said first stream through a heat pump to thereby transfer heat from said second stream to said first stream.

2. The method of claim 1, wherein the temperature of the first stream of cooling water is above the dew point of the flue gas and the temperature of the second stream of cooling water is below the dew point of the flue gas.

3. The method of claim 2 wherein the combustion furnace is the furnace of a steam boiler in a power generation plant and said first stream is fresh feed water to be fed to the steam boiler for power generation.

4. The method of claim 3 wherein said heat pump comprises an evaporator, a compressor, and a condenser, and a refrigerant flowing in a cycle through said evaporator, compressor and condenser.

5. The method of claim 4 further comprising passing the second stream of cooling water in heat exchange relationship with the heat pump refrigerant in the heat pump evaporator to thereby transfer heat from the second stream of cooling water to the refrigerant.

6. The method of claim 4 further comprising passing the first stream of cooling water in heat exchange relationship with the heat pump refrigerant in the heat pump condenser to thereby transfer heat from the refrigerant to the first stream of cooling water.

7. The method according to claim 4 further comprising the steps of blowing down a stream of fluid from the steam boiler to the atmosphere, and passing said stream of blowdown fluid in heat exchange relationship with the first stream of water exiting from thermal contact with the flue gas prior to the passage of the blowdown fluid to the atmosphere.

8. The method of claim 7 further comprising the steps of combining said blowdown fluid with said second stream of water exiting from contact with the flue gas and passing said combined stream in heat exchange relationship with the fresh feed water being fed to the steam boiler.

9. The method of claim 8, further comprising the step of passing said combined blowdown fluid stream through the evaporator of said heat pump to further extract heat from said combined stream prior to the passage of the blowdown fluid to the atmosphere.

10. A method according to claim 1, wherein the combustion furnace is the furnace of a boiler of a steam generation system for heating process water wherein said first stream of water is the feed water which is fed to the boiler to be heated into process water further comprising the steps of:
    passing said flue gas into direct contact with a third stream of cooling water wherein the temperature of the third stream exiting from direct contact with the flue gas is intermediate the temperature of the first stream exiting from thermal contact with the flue gas and the temperature of the second stream exiting from direct contact with the flue gas;
    passing a first portion of the third stream exiting from direct contact with the flue gas into thermal contact with the combustion air entering the boiler to preheat the air for combustion;
    passing a second portion of the third stream exiting from direct contact with the flue gas into heat exchange relationship with the feed water to thereby further transfer heat to the feed water.

11. The method of claim 10, wherein said heat pump comprises an evaporator, a compressor, and a condensor, and a refrigerant flowing in a cycle through said evaporator, compressor and condenser.

12. The method of claim 11 further comprising passing the second stream of cooling water in heat exchange relationship with the heat pump refrigerant in the heat pump evaporator to thereby transfer heat from the second stream to the heat pump refrigerant.

13. The method of claim 11 further comprising passing the first stream of cooling water in heat exchange relationship with the heat pump refrigerant in the heat pump condenser to thereby transfer heat from the heat pump refrigerant to the first stream.

14. The method of claim 10, further comprising blowing down a stream of fluid from the boiler to the atmosphere and passing the stream of blowdown fluid in heat exchange relationship with the feed water entering the boiler, thereby further heating the feed water.

15. The method of claim 14, further comprising combining the stream of blowdown fluid with the third stream of water exiting from direct contact with the flue gas subsequent to passing the blowdown fluid into heat exchange relationship with the feed water and passing said combined stream into heat exchange relationship with the feed water to further heat the feed water.

16. A method of utilizing the heat in the flue gas leaving the steam boiler of a steam turbine power generation plant comprising:

passing the boiler feed water entering the steam boiler in thermal contact with the flue gas exiting the boiler;

passing a stream of cooling water in direct contact with said flue gas to transfer heat from said flue gas to said stream of cooling water;

pumping at least a portion of said stream of cooling water through a heat pump to transfer heat from said stream of cooling water to a working fluid;

passing said working fluid through a supplementary power generator to convert the heat transferred from the stream of cooling water to the working fluid into power.

17. The method of claim 16, wherein the step of pumping at least a portion of said stream of cooling water through a heat pump further comprises passing at least a portion of said stream of cooling water through a refrigerant evaporator to thereby evaporate a refrigerant contained therein, and compressing said vaporized refrigerant and condensing said refrigerant in thermal contact with said working fluid thereby transfering heat from said stream of cooling water.

18. The method of claim 17, wherein the step of compressing said vaporized refrigerant is a two-stage compression process and the step of condensing said refrigerant is a two-stage condensation process.

19. The method of claim 16, wherein the working fluid is a refrigerant and the supplementary power generator is a vapor generator further comprising the steps of:

boiling the working fluid by passing said working fluid in thermal contact with the steam exiting from the steam turbine in a steam condenser;

passing said boiling, working fluid through said vapor turbine to generate power.

20. The method of claim 19 further comprising the step of passing a second portion of said stream of cooling water in heat exchange relationship with said working fluid to transfer heat from said stream of cooling water to said working fluid.

21. The method of claim 20 further comprising the step of passing a third portion of said stream of cooling water in thermal contact with air entering the boiler to preheat said air for combustion.

22. The method of claim 16 further comprising the steps of:

passing a second stream of cooling water in direct contact with said flue gas to transfer heat from said flue gas to said second stream of cooling water;

passing said second stream of cooling water in heat exchange relationship with said working fluid to transfer heat from said second stream of cooling water.

23. Apparatus for recovering the heat from the flue gas leaving a combustion furnace of a steam boiler comprising:

an economizer connected with the combustion furnace for the passage of a first stream of boiler feed water in thermal contact with the flue gas leaving the combustion furnace;

a first direct contact gas cooler connected with said economizer for passing a second stream of cooling water in direct contact with the flue gas leaving the economizer whereby heat is removed from said flue gas and added to said second stream; and a heat pump connected in heat exchange relationship with said second stream and said first stream whereby heat is pumped from said second stream to said first stream.

24. The apparatus of claim 23 wherein said heat pump comprises an evaporator, a compressor, a condenser, and a refrigerant circulating between said evaporator, said compressor and said condenser, means connecting said second stream in heat exchange relationship with said evaporator, and means connecting said first stream in heat exchange relationship with said condenser, whereby the heat transferred from said second stream to said refrigerant in said evaporator is transferred from said refrigerant to said first stream in said condenser.

25. The apparatus of claim 24 wherein a portion of the steam in the steam boiler is blown down to the atmosphere further comprising a heat exchanger connected with said portion of the steam blown down to the atmosphere and said first stream leaving the economizer and entering the boiler.

26. The apparatus of claim 25 further comprising a second heat exchanger connected with said portion of the steam blown down to the atmosphere and said first stream leaving said condenser and entering said economizer.

27. The apparatus of claim 26 further comprising an inlet for the first stream of boiler feed water and a third heat exchanger connected with said portion of the steam blown down to the atmosphere and said first stream leaving said inlet and entering said condenser.

28. The apparatus of claim 23 further comprising a second direct contact gas cooler connected in series with said first direct contact gas cooler, said second gas cooler being interposed between said first gas cooler and said economizer so that the flue gas passes from said economizer through said second gas cooler in direct contact with a third stream of cooling water and into said first gas cooler, and means for exchanging heat from said third stream to said first stream.

29. The apparatus of claim 28 wherein the steam boiler is used to heat process water for process requirements and a deaerater is provided in said first stream entering said economizer.

30. The apparatus of claim 29 wherein an air heater is provided to preheat the combustion air used in the combustion furnace further comprising means for circulating the portion of said third stream leaving said second gas cooler in said air heater to preheat said combustion air.

31. The apparatus of claim 29 wherein said heat pump comprises an evaporator, a compressor, a condenser, and a refrigerant circulating between said evaporator, said compressor, and said condenser, means connecting said second stream in heat exchange relationship with said evaporator, and means connecting said first stream in heat exchange relationship with said condenser, whereby the heat transferred from said second stream to said refrigerant in said evaporator is transferred from said refrigerant to said first stream in said condenser.

32. The apparatus of claim 31 wherein a portion of the steam in the steam boiler is blown down to the atmosphere further comprising a heat exchanger connected with said portion of the steam blown down to the atmosphere and said first stream leaving the condenser and entering the deaerator.

33. The apparatus of claim 32 further comprising an inlet for the first stream of boiler feed water, and a second and third heat exchanger connected with said portion of the steam blown down to the atmosphere and said first stream leaving said inlet and entering said condenser.

34. Apparatus for recovering the heat from the flue gas leaving the combustion furnace of the steam boiler of a steam turbine power generation plant comprising:
- an economizer connected with the combustion furnace for the passage of a first stream of boiler feed water in thermal contact with the flue gas leaving the combustion furnace;
- a first direct contact gas cooler connected with said economizer for passing a second stream of cooling water in direct contact with the flue gas leaving the economizer whereby heat is removed from said flue gas and added to said second stream;
- a heat pump connected in heat exchange relationship with said second stream; and
- an auxiliary power generator connected in heat exchange relationship with said heat pump whereby heat removed by said second stream from said flue gas is pumped from said second stream to power said auxiliary power generator.

35. The apparatus of claim 34 wherein said heat pump comprises an evaporator, a compressor, a condenser and a heat pump refrigerant circulating between said evaporator, said compressor and said condenser, and means connecting a portion of said second stream in heat exchange relationship with said evaporator.

36. The apparatus of claim 35 wherein said compressor of said heat pump comprises a two-stage compressor having a first stage and a second stage, and the condenser of said heat pump comprises a first condenser and a second condenser, wherein a portion of said heat pump refrigerant exiting said first stage compressor is directed to said first condenser and a portion of said heat pump refrigerant exiting said first stage compressor is directed to said second stage compressor and then to said second condenser.

37. The apparatus of claim 36 wherein said auxiliary power generator is a refrigerant vapor turbine further comprising a turbine refrigerant boiler connected with said steam turbine and said refrigerant vapor turbine for passing said turbine refrigerant in heat exchange relationship with the steam exhausting from said steam turbine, a turbine refrigerant condenser for condensing the refrigerant exhausting from said refrigerant vapor turbine, and wherein the turbine refrigerant is passed in heat exchange relationship with the heat pump refrigerant in said first and second condensers.

38. The apparatus of claim 37 wherein said heat pump refrigerant and said turbine refrigerant are the same material and said first and second heat pump condensers are direct contact condensers.

39. The apparatus of claim 37 further comprising a second direct contact gas cooler arranged in series with said first gas cooler so to receive the flue gas from said first gas cooler after the flue gas has passed from said economizer and through said first gas cooler, said second gas cooler passing a third stream of cooling water in direct contact with said flue gas whereby heat is removed from said flue gas and added to said third stream, and a heat exchanger connected with said third stream and said turbine refrigerant exiting said turbine refrigerant condenser.

* * * * *